A. GRIEVES.
MOWING MACHINE.
APPLICATION FILED DEC. 7, 1911.
1,164,713.
Patented Dec. 21, 1915.
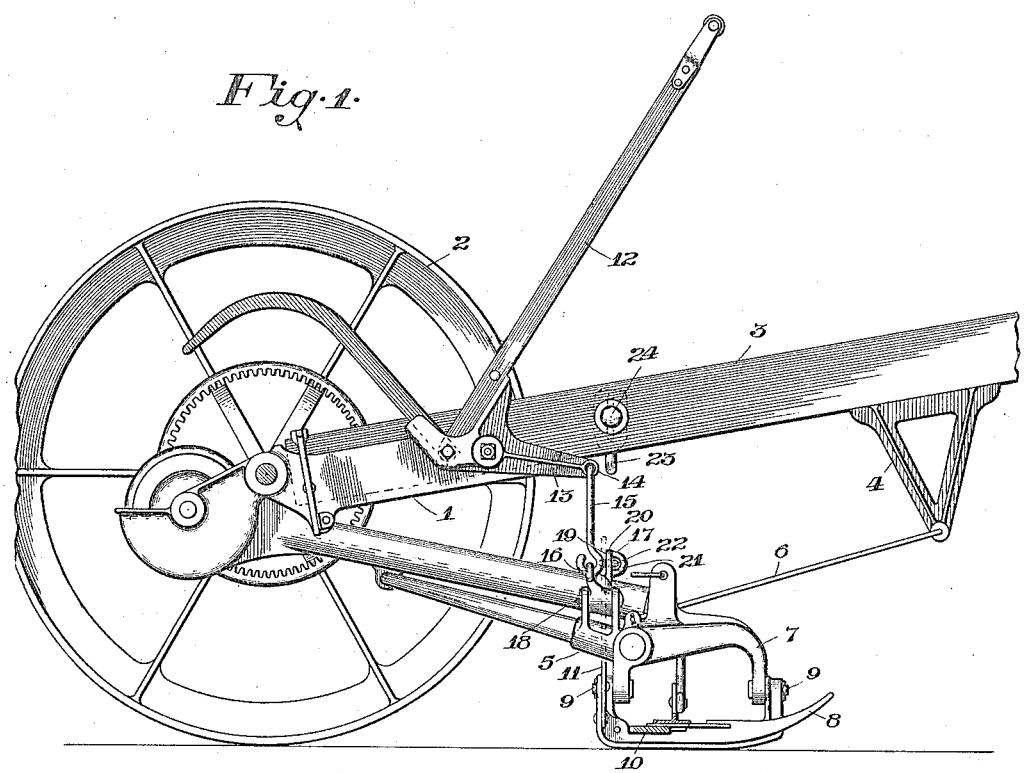
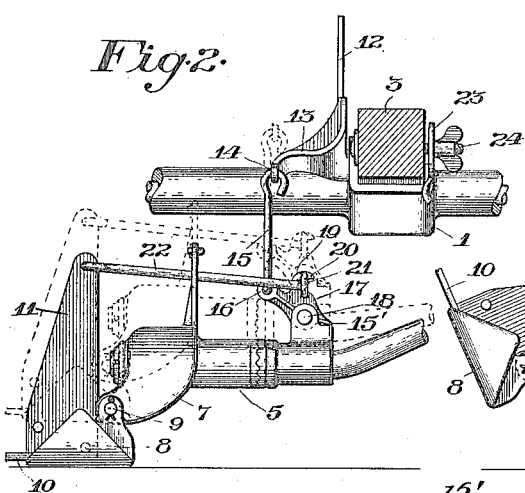
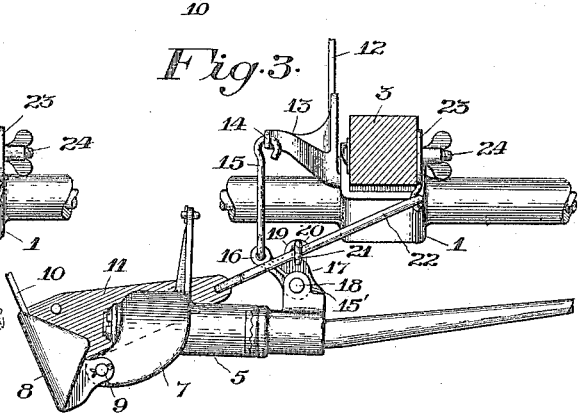
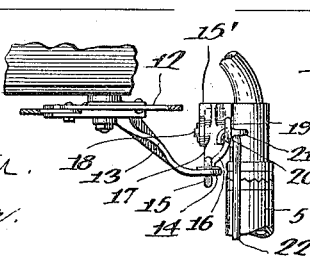
Witnesses:
F. W. Hoffmeister.
C. C. Palmer.
Inventor·
Albert Grieves·
By E. W. Burgess
Attorney·

UNITED STATES PATENT OFFICE.

ALBERT GRIEVES, OF SPRINGFIELD, OHIO, ASSIGNOR TO INTERNATIONAL HARVESTER COMPANY, A CORPORATION OF NEW JERSEY.

MOWING-MACHINE.

1,164,713.  Specification of Letters Patent.  Patented Dec. 21, 1915.

Application filed December 7, 1911.  Serial No. 664,350.

*To all whom it may concern:*

Be it known that I, ALBERT GRIEVES, a citizen of the United States, residing at Springfield, in the county of Clark and State of Ohio, have invented certain new and useful Improvements in Mowing-Machines, of which the following is a specification.

My invention relates to mowing machines, and in particular to those having the cutting apparatus thereof hinged to one end of a coupling frame that is pivotally connected at its opposite end with the wheeled frame of the machine whereby a rising or falling movement of the cutting apparatus is permitted. In the class of machines indicated a lifting lever is mounted upon the wheeled frame and flexibly connected with the coupling frame and finger bar in a manner to raise or lower the cutting apparatus to a limited degree, and a hinge connection between the coupling frame and the finger bar permits the latter to be folded to substantially a vertical position for transportation or other purposes, in which position it is usually secured by means of a latch mechanism or other means connecting it with a fixed part of the machine; the object of my invention being to improve and simplify such securing means and also to provide a mechanism operative in a dual capacity either as a connecting member between the finger bar and the lifting lever in the regular operation of the machine, or operative as a connecting link between the wheeled frame and the finger bar in a manner to secure the latter in a vertical position. These objects are attained by means of mechanism, one embodiment of which is illustrated in the accompanying drawings, in which—

Figure 1 represents a side elevation of a mowing machine having my invention forming a part thereof; Fig. 2 is a front elevation of part of Fig. 1, designed to illustrate the operation of the raising and lowering mechanism connected with the coupling frame and the finger bar during the regular operation of the machine; Fig. 3 represents the position of the same parts when the finger bar is raised to substantially a vertical position; and Fig. 4 is a top plan view of part of the mechanism shown in Fig. 2.

The same reference characters designate like parts throughout the several views.

1 represents the wheeled frame of the machine, 2 one of the carrying wheels, 3 the draft tongue secured to the wheeled frame, 4 a draft bracket secured to the tongue, 5 a coupling frame having the stubbleward end thereof pivotally connected with the wheeled frame, 6 a draft link connecting the draft bracket with said coupling frame, 7 a coupling yoke carried by the coupling frame and adapted to rock thereon, 8 an inner shoe connected with the yoke by means of hinge pins 9 arranged in a horizontal plane and in a fore and aft direction, 10 a finger bar having its inner end secured to said shoe, 11 a vertically arranged arm secured to said shoe, 12 a lifting lever pivotally mounted upon the wheeled frame of the machine and having a forwardly extending arm 13, provided with an eye portion 14 whereby a connection is made with the upper end of the link 15, the lower end of the link being connected with an arm 16 forming part of a bell crank lever 17 that is pivotally connected with the coupling frame by means of a pin 18, said lever having a toe portion $15^1$ that contacts with a fixed part of the structure in a manner limiting a swinging movement thereof in one direction. The parts as described above are common to the class of machines indicated. 19 represents the remaining arm of the bell crank lever 17 that is provided with a hook 20 at the stubbleward end thereof that is open stubbleward and provided with a laterally projecting eye member 21, at the front side thereof at right angles with the arm 19 and in the direction of the line of draft, said eye member being adapted to slidably receive the body portion of a link or latch 22 that is provided with a hook portion at one end thereof that engages with the hook 20 when the cutting apparatus is in an operative position, the opposite end of the link 22 being pivotally connected with the vertical member 11 of the shoe 8.

When the machine is in operation, with the finger bar in a horizontal position relative to the wheeled frame and controlled by the hand lever mechanism, the link 22 will have the hooked end thereof engaging with hook 20 that is disposed at right angles with the line of draft of the machine in a manner to sustain the finger bar in any range of its movement caused by a manipulation of the lifting lever, as shown in Fig. 2.

When it is desired to adjust the finger bar to a vertical position the coupling frame is first raised to the position shown by dotted lines in Fig. 2 by means of the lifting lever, and when the finger bar is turned to substantially a vertical position as shown in Fig. 3, which may be done by the operator raising the grainward end thereof independent of the lifting lever, the link 22 will slide in a stubbleward direction through the eye 21, the portion of the eye in the direction of the line of draft engaging with the body of the link in a manner preventing any lateral swing thereof that would permit of its being released from the eye, and the toe portion 15¹ of the bell crank lever prevents any upward swing of arm 16.

23 represents a clip secured to the stubbleward side of the draft tongue by means of a bolt 24 received by a slotted opening in the body of the clip in a manner permitting an adjustment of the clip vertically upon the tongue, the clip being provided at its lower end with a depending hook portion adapted to receive the hooked end of the link 22 that may be guided by the hand of the operator in a manner securing the finger bar in a vertical position, as shown in Fig. 3.

To return the cutting apparatus from the vertical and inoperative position to an operative one, the operator first moves the upper end of the cutter bar toward the wheeled frame by hand, independent of the lifting lever mechanism, until the hooked end of the link 22 may be disengaged from the clip 23.

While I have in this application specifically described one embodiment which my invention may assume in practice it is to be understood that the form thereof shown herein is used for purposes of illustration, and may be modified without departing from the spirit of the invention.

What I claim as my invention, and desire to secure by Letters Patent, is:

1. In a mowing machine, a coupling frame, a finger bar operatively connected thereto, a transversely disposed link carried on said finger bar, and link supporting and guiding means operatively connected to said coupling frame slidably receiving the free end of said link.

2. In a mowing machine, a coupling frame, a finger bar operatively connected thereto, a transversely disposed link pivotally connected to said finger bar, and link supporting means operatively connected to said coupling frame slidably receiving the free end of said link and limiting the bodily movement thereof in one direction.

3. In a mowing machine, a coupling frame, a finger bar operatively connected thereto, a transversely disposed link pivotally connected to said finger bar, and means operatively connected to said coupling frame for permitting free bodily movement of said link relatively thereto when said finger bar is moved in opposite directions and limiting the movement thereof in one direction.

4. In a mowing machine, a coupling frame, a finger bar operatively connected thereto, a transversely disposed latch member carried on said finger bar, and latch supporting means on said coupling frame for guiding and limiting the movement of said latch member with respect thereto when said finger bar is moved independently of said coupling frame.

5. In a mowing machine, a machine frame, a coupling frame operatively connected thereto, means on said machine frame for raising and lowering said coupling frame, a finger bar operatively connected to said coupling frame, a transversely disposed link pivotally connected to said finger bar, and supplemental link supporting means carried on said raising and lowering means for guiding and limiting said link in its movement as said finger bar is moved independently of said coupling frame.

6. In a mowing machine, a machine frame, a coupling frame adjustably mounted thereon, a finger bar adjustably mounted on said coupling frame, lever mechanism for adjusting said coupling frame, a supporting member connected to said machine frame and means for holding said finger bar in position with respect to said coupling frame when the latter is moved, said means including a latch member engageable with said supporting member when said finger bar is moved independently of said coupling frame.

7. In a mowing machine, a machine frame, a coupling frame adjustably mounted thereon, a finger bar adjustably mounted on said coupling frame, lifting mechanism for adjusting said coupling frame, a supporting member connected to said machine frame, means carried by said finger bar engageable with said supporting member when said finger bar is moved independently of said coupling frame in one direction, and means on said coupling frame coöperating with said last mentioned means and automatically limiting the movement of said finger bar with respect to said coupling frame when said bar is released from said supporting member.

8. In a mowing machine, a machine frame, a coupling frame adjustable with respect thereto, a finger bar carried by said coupling frame and movable independently thereof, lever mechanism for adjusting said coupling frame, a supporting member connected to said machine frame and means including a latch for holding said finger bar in position with respect to said coupling frame during movement of the latter, said latch being engageable with said supporting member to hold the finger bar in position with respect to said machine frame when said bar is moved independently of said coupling frame.

9. In a mowing machine, a machine frame, a coupling frame adjustable with respect thereto, a finger bar carried by said coupling frame and movable independently thereof, lever mechanism for adjusting said coupling frame, a supporting member connected to said machine frame, and means including a single sliding latch member pivoted on said finger bar for holding said finger bar in position with respect to said coupling frame as the latter is raised, said latch member being engageable with said supporting member when said finger bar is moved independently of said coupling frame and automatically resuming its original function when released from said supporting member.

10. In a mowing machine, a machine frame, a coupling frame adjustably mounted thereon, a finger bar adjustably mounted on said coupling frame, means for adjusting said coupling frame, a supporting member connected to said machine frame and means including a latch operatively connected between said finger bar and said coupling frame transmitting the movement of the latter to said finger bar when said coupling frame is raised and operable when the finger bar is moved independently of said coupling frame to engage said supporting member to hold said finger bar in position.

11. In a mowing machine, a machine frame, a coupling frame adjustably mounted thereon, a finger bar pivotally attached to said coupling frame, an adjusting lever carried on said machine frame, a lever pivoted on said coupling frame, a link connection intermediate said adjusting lever and said last mentioned lever, and a sliding latch pivotally connected to said finger bar and guided and limited in its movement by the lever on said coupling frame.

12. In a mowing machine, a machine frame, a coupling frame adjustably carried thereby, a finger bar carried by said coupling frame, an adjusting lever for said coupling frame carried on said machine frame, a bell crank lever carried on said coupling frame pivotally connected to said adjusting lever, and a latch carried by said finger bar and adjustable with respect to said bell crank and guided and limited in its movement by the latter.

13. In a mowing machine, a machine frame, a rising and falling coupling frame carried thereon, a finger bar carried by said coupling frame, raising and lowering mechanism for said coupling frame carried on said machine frame and including a lever pivoted on said coupling frame, a sliding link connection pivotally connected to said finger bar and guided and limited in its movement by the lever on said coupling frame, and means on said last mentioned lever for limiting its movement with respect to the coupling frame.

14. In a mowing machine, a machine frame, a coupling frame adjustably mounted thereon, a finger bar pivotally attached to said coupling frame, an adjusting lever carried on said machine frame, a bell crank lever pivoted on said coupling frame, a link connection intermediate said adjusting lever and said bell crank lever, a sliding latch pivotally connected to said finger bar and guided and limited in its movement by said bell crank lever, and a hook carried on said machine frame engageable by said latch when said finger bar is moved in one direction independently of said coupling frame.

15. In a mowing machine, a machine frame, a coupling frame pivotally mounted beneath the same, a finger bar carried on said coupling bar and independently adjustable with respect thereto, an adjusting lever for said coupling frame and finger bar carried on said machine frame, a bell crank lever pivoted on said coupling frame having a hook on one end thereof and a guide adjacent the same, a link connected between said adjusting lever and said bell crank lever, and a link having one end pivotally connected to said finger bar and the other slidable through the guide in said bell crank lever to and from engaging position with the hook on said bell crank lever.

16. In a mowing machine, a machine frame, a coupling frame pivotally mounted beneath the same, a finger bar carried on said coupling bar and independently movable with respect thereto, an adjusting lever for said coupling frame and finger bar carried on said machine frame, a bell crank lever pivoted on said coupling frame having a hook on one end thereof and a guide adjacent the same, a link connected between said adjusting lever and said bell crank lever, a supporting member connected to said machine frame, and a link having one end pivotally connected to said finger bar and the other slidable through the guide in said bell crank lever to and from engaging position with the hook on said bell crank lever, said link having a hook shaped end engageable with said supporting member to position the finger bar with respect thereto when the latter is moved to its up position.

17. A mowing machine including, in combination, a wheeled frame, a rising and falling coupling frame having one end thereof pivotally connected with said wheeled frame, a finger bar hinged to said coupling frame in a manner permitting said bar to be raised to substantially a vertical position, means for raising and lowering said coupling frame relative to said wheeled frame, said means including a lifting lever pivotally mounted upon said wheeled frame, a bell crank lever pivotally mounted upon said coupling frame, a link connection between said hand lever and one arm of the said bell crank lever, a link having one end connected with said finger bar and the body portion thereof slidably received by an opening in the remaining arm of said bell crank lever in a manner permitting said finger bar to swing to substantially a vertical position, the opposite end thereof being provided with a hook adapted to engage with the wall of the opening in said arm when said finger bar is lowered to a horizontal position, and means whereby said hook may be connected with a fixed part of the machine when said finger bar is raised to a vertical position.

18. A mowing machine including, in combination, a wheeled frame, a rising and falling coupling frame having one end thereof pivotally connected with said wheeled frame, a finger bar hinged to said coupling frame in a manner permitting said bar to be raised to substantially a vertical position, means for raising and lowering said coupling frame relative to said wheeled frame, said means including a lifting lever pivotally mounted upon said wheeled frame, a bell crank lever pivotally mounted upon said coupling frame in a manner having a limited rocking movement in one direction, a link connection between said hand lever and one arm of said bell crank lever, a link having one end thereof connected with said finger bar and the body portion thereof slidably received by an opening in the remaining arm of said bell crank lever in a manner permitting said finger bar to swing to substantially a vertical position, the opposite end of said link being provided with a hook adapted to engage with the wall of the opening in the arm when said finger bar is lowered to a horizontal position, a clip member secured to the frame of the machine and provided with a hook portion adapted to receive the hook portion of said slidable link when said finger bar is raised to substantially a vertical position.

ALBERT GRIEVES.

Witnesses:
W. B. KENDIG,
H. J. GREYTON.

Copies of this patent may be obtained for five cents each, by addressing the "Commissioner of Patents, Washington, D. C."